Dec. 30, 1969  J. A. CAHILL  3,487,427
METHOD AND APPARATUS FOR SAMPLING ORE AND THE LIKE
Filed May 3, 1968  5 Sheets-Sheet 1
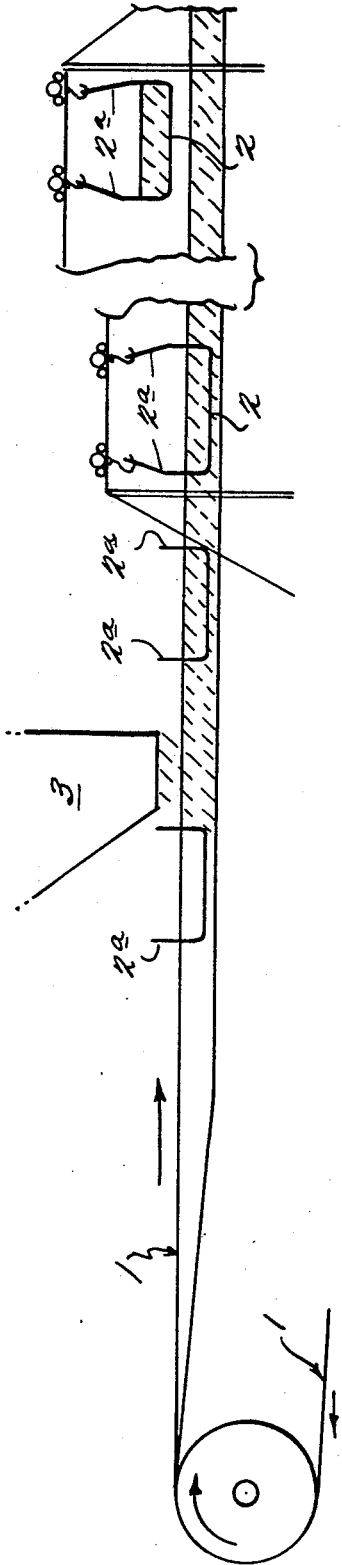
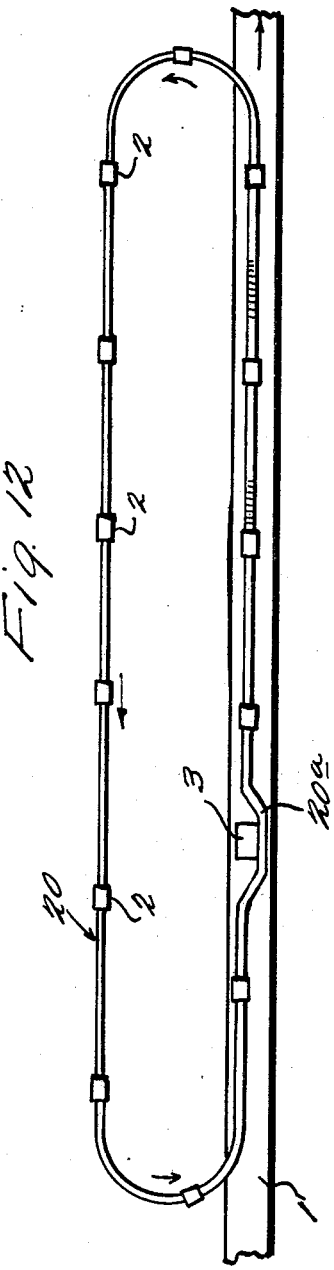
INVENTOR
JOHN A. CAHILL
BY
ROBERT U. GEIB, JR.
ATTORNEY

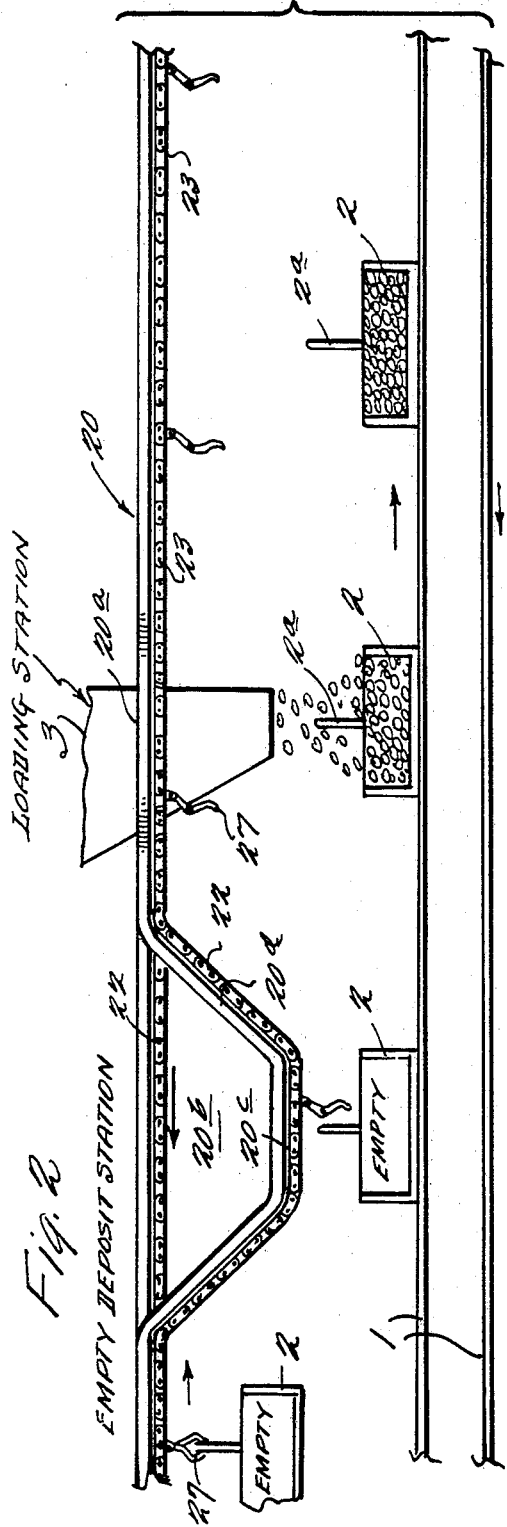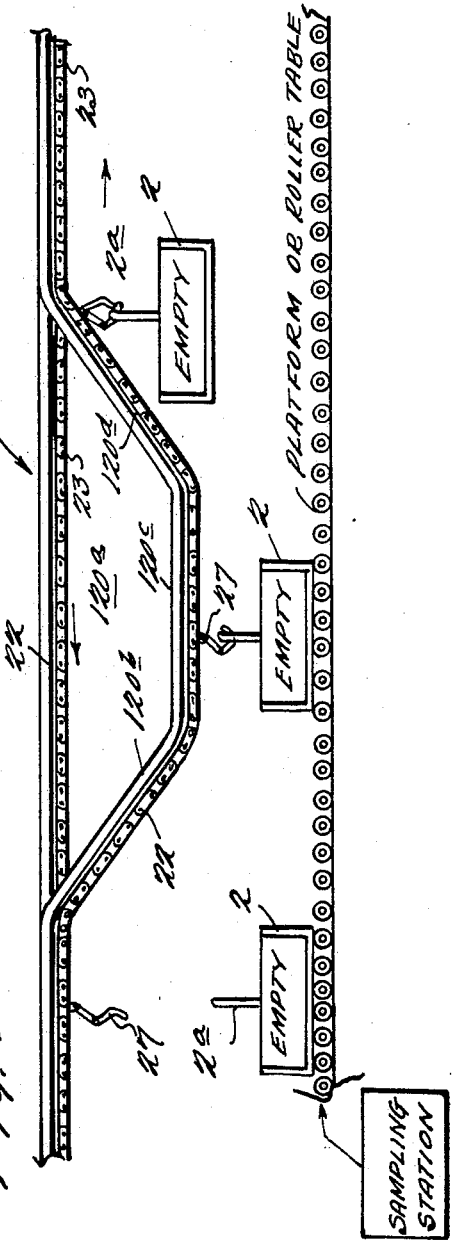

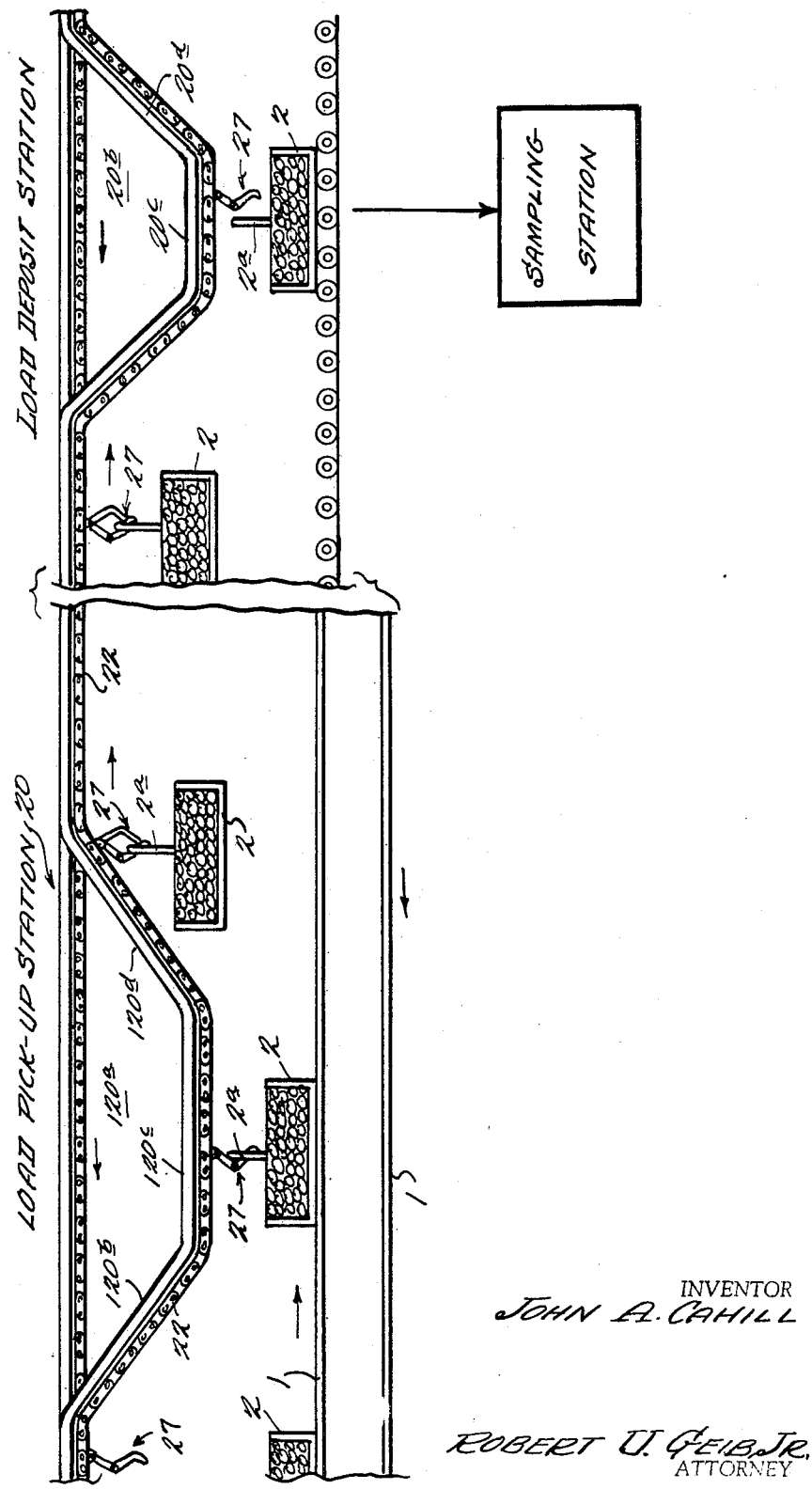

Dec. 30, 1969   J. A. CAHILL   3,487,427
METHOD AND APPARATUS FOR SAMPLING ORE AND THE LIKE
Filed May 3, 1968   5 Sheets-Sheet 4
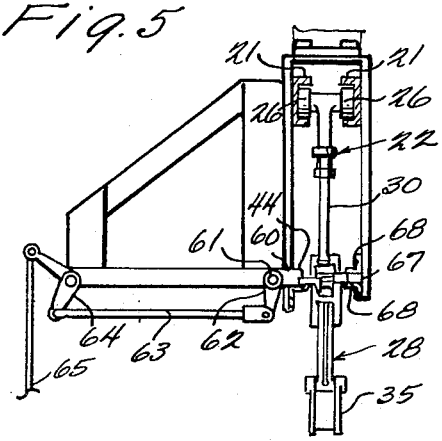
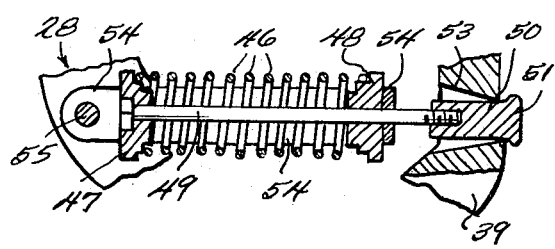
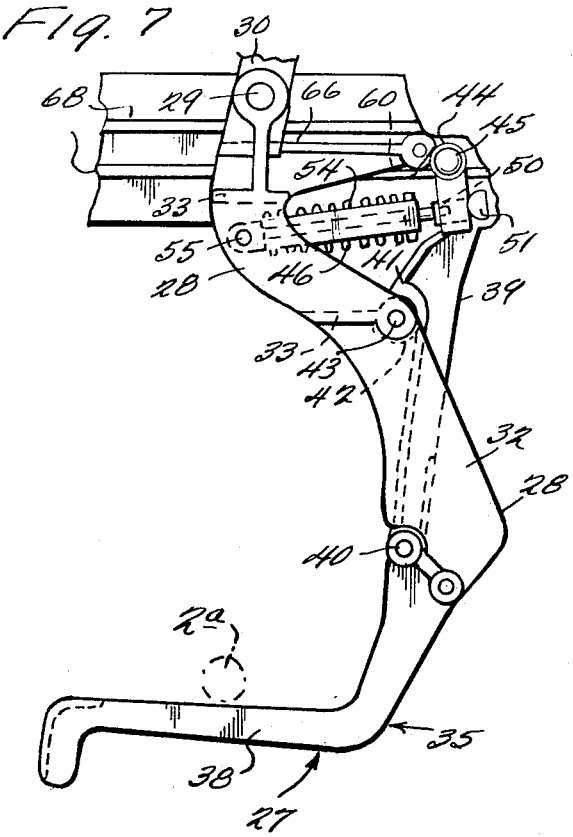
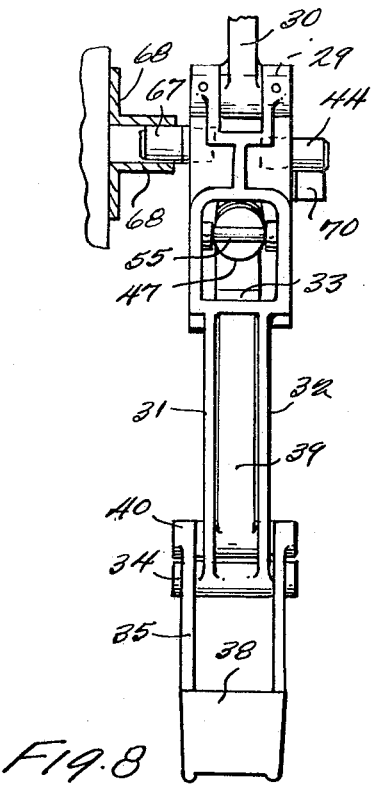
INVENTOR
JOHN A. CAHILL
BY
ROBERT U. GEIB, JR.
ATTORNEY Dec. 30, 1969        J. A. CAHILL        3,487,427
METHOD AND APPARATUS FOR SAMPLING ORE AND THE LIKE
Filed May 3, 1968        5 Sheets-Sheet 6
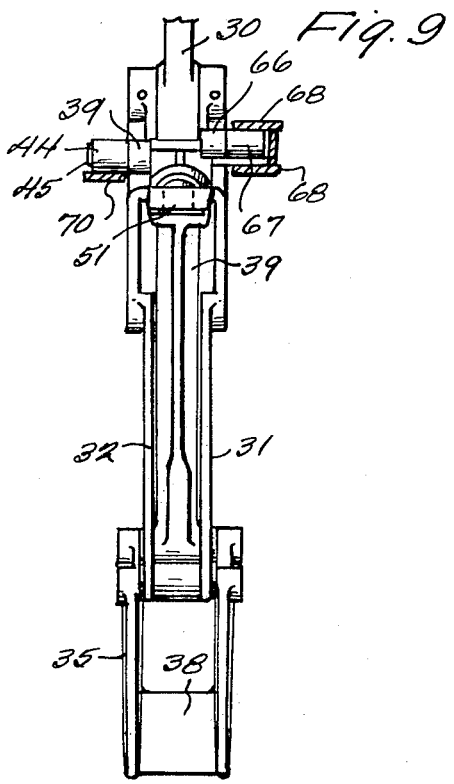
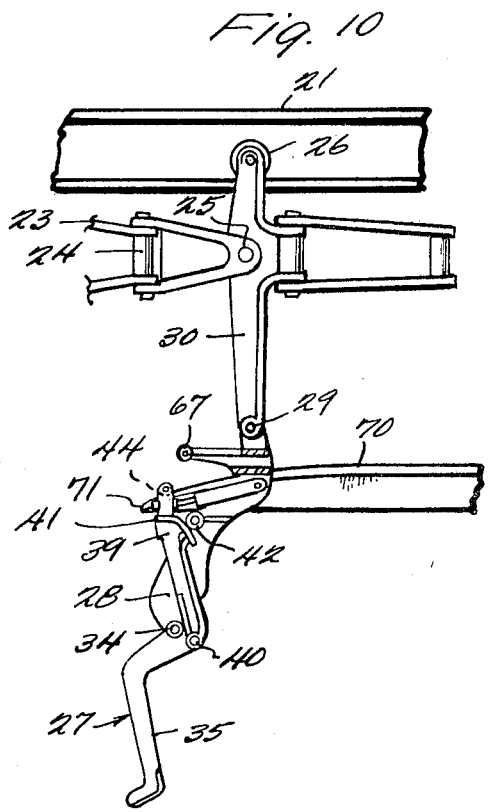
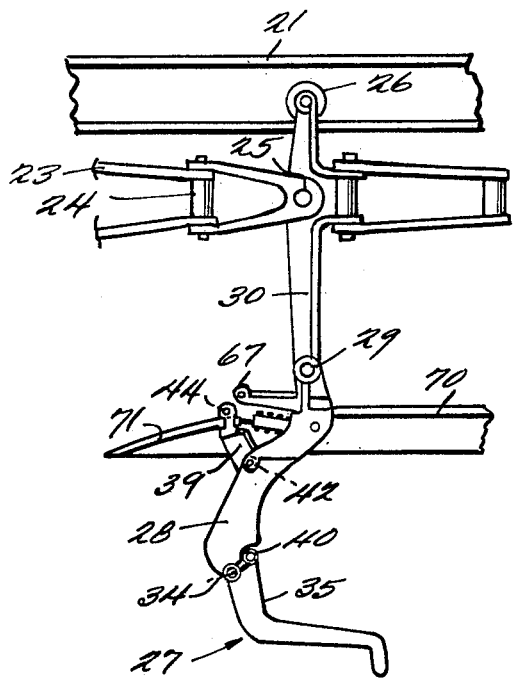
INVENTOR
JOHN A. CAHILL
BY
ROBERT U. GEIB, JR.
ATTORNEY United States Patent Office 3,487,427
Patented Dec. 30, 1969

3,487,427
METHOD AND APPARATUS FOR SAMPLING ORE AND THE LIKE
John A. Cahill, Rio de Janeiro, Brazil, assignor to D & P Minerals, Inc., Harrisburg, Pa., a corporation of Pennsylvania
Filed May 3, 1968, Ser. No. 726,351
Claims priority, application Brazil, May 5, 1967, 189,191
Int. Cl. G01n 1/02
U.S. Cl. 73—421         5 Claims

ABSTRACT OF THE DISCLOSURE

An elongate sample collector or container having a longitudinal dimension corresponding to the width of the conveyor belt is moved while empty onto the conveyor belt in such manner as to extend across the same at a position where it receives, from above, that portion of the particulate material which otherwise would have fallen onto the conveyor belt; thereafter removing the appropriately filled sample collector from the conveyor belt and transferring it to a receiving station where it is available for analysis.

---

This invention relates to the sampling of ores and other particulate material and especially to the removal of representative quantities thereof from a moving endless conveyor belt.

As is well known, many mining and other industrial activities require established data regarding a given particulate material; and when it is not possible to examine the entire quantity under inspection it becomes necessary to utilize statistical procedures which provide the desired data. Such procedures include the removal of samples which are representative of the whole and which may be analyzed to provide generalized data that is applicable to the whole or mass.

In the case of bulk cargoes of any nature, it is invariably necessary to establish such values as: chemical composition, granulo-metric composition, moisture content, contamination, etc. from samples which have been removed from the bulk or mass.

The principal difficulty in sampling is, of course, in selecting a process or combination of processes, which are appropriate to the different fields of observation to the end that these will give results which are actually representative of the whole. The most appropriate procedure for sampling is determined by the form and conditions of the mass.

In the case of bulk cargoes, sampling may be done at stock-piles, at railroad cars, shipside, or any other points of loading or unloading, and for each of these instances there are certain established procedures.

However, the sampling procedure giving the most reliable results is that which is done on conveyor belts during the transfer of the material; and the reason for this is that (1) The entire quantity of material is under observation.

(2) The sampling may be done at regular intervals.

(3) The quantity of sample and intervals of sampling can be varied to any degree necessary or desirable.

There are essentially two well-known ways of obtaining samples from conveyor belts.

The first, and simplest, way comprises the manual removal of a typical sample section across the width of the conveyor belt when it is at a standstill. Not only is the stopping and restarting commercially disadvantageous, but this process depends to a greater or lesser degree upon the accuracy and dependability of those who are charged with the responsibility thereof, as against undesirable agitation and/or spillage during removal from the conveyor belt.

The second of these well known ways of obtaining samples from conveyor belts is completely mechanical, being performed without human intervention and while the conveyor belt is in motion, sometimes comprising equipment which is built into the conveyor system itself. So far as I am aware, equipment falling into this category has, prior to the present invention, created considerable doubt as to the technical accuracy of the samples taken from the moving conveyor belt. Another disadvantage of the better known equipment of this type is that its operation incorporates characteristics which undesirably modify, as by agitation etc. the physical properties of the sample it removes from the moving conveyor belt.

The problems referred to hereinbefore become much more acute when the material to be sampled is characteristically rough in nature such as metallic ores and moving along on a wide endless conveyor belt at a linear speed of from 400 feet per minute to 800 feet per minute and sometimes considerably faster.

The proper sampling of such ores usually requires a quantity which will weigh between 200 pounds to 300 pounds, and possibly more; and accurate results cannot be obtained simply by diverting such quantities with flow dividers or equivalent devices which are positioned at certain intervals along the path of movement of the endless conveyor belt and which stir the material to an extent where the coarse and fines are intermixed accompanied by an increase in the ratio between the coarse and fine particles.

It is among the objects of the present invention to provide an improved process and apparatus for removing samples of particulate materials such as metallic ores from a conveyor belt which is moving at substantial speed.

Another object is the provision of a process and apparatus of the type described which obtain and transfer for subsequent analysis, samples which are truly representative of the material which is moving along the conveyor belt, whereby the data obtained therefrom may, with accuracy, be generalized for the total mass under observation.

Another object is to remove from the conveying apparatus from time-to-time a sample which is a rigorously exact part of the charge moving from a preliminary conveying instrumentality, such as a wide-mouthed funnel or hopper, onto the endless conveyor belt; and without interference with the endless conveyor belt and without oscillating or jarring the sample transfer it to a depot or station at which it is available for purposes of analysis.

A further object is the attainment of the improved results described hereinbefore while using apparatus which is relatively inexpensive to install, operate and maintain.

The foregoing and other objects and advantages will be more readily understood after referring to the following description and accompanying drawings wherein like reference numerals designate like parts, and wherein:

FIGURE 1 is a schematic side elevational view which generally illustrates apparatus that may be utilized to practice the process of the present invention.

FIGURE 2 is a side elevational view illustrating a form of conveying system which may be satisfactorily utilized to move empty sample collectors or containers to, and deposit the same on, a conventional endless belt conveyor at a position which is upstream with respect to the point where the particulate material is supplied to said conveyor. According to a simplified embodiment of the invention, the filled or loaded sample collectors may be permitted to remain on, and travel with, the endless belt conveyor, to a suitable point downstream; and there removed from the endless belt conveyor in any suitable manner for purposes of analyzing the sample; after which the empty sample collector is picked-up and returned to the position shown at the left-hand extremity of FIGURE 2.

FIGURE 3 is a view which is generally similar to that of FIGURE 2 but illustrating the empty pick-up station of the overhead conveyor system for handling the sample collectors; which station may be distantly disposed with respect to the endless belt conveyor and comprise a platform, roller table, or the like.

FIGURE 4 is a composite side elevational view divided along the breakaway line and illustrating a load pick-up station and load deposit station for situations where it is desired to remove the loaded sample collector from the endless belt conveyor shortly after it has been loaded and transfer it directly to the sampling station, which may be relatively distant, and from which the emptied container may be picked-up by the apparatus of FIGURE 3 and returned to the empty deposit station shown at the left-hand extremity of FIGURE 2.

FIGURE 5 is a fragmentary view, partly in section, illustrating a form of tripping mechanism for the trip hooks of the conveying system for the sample collectors;

FIGURE 6 is a fragmentary elevation, partly in section and on an enlarged scale, illustrating a resilient connection between the body member of a trip hook and a latch means therefor;

FIGURE 7 is an enlarged side elevational view, partly in section, of one of the trip hooks;

FIGURE 8 is an end elevational view, partly in section, of the parts shown in FIGURE 7 as seen from the left of the latter;

FIGURE 9 is a view similar to FIGURE 8 but with the parts as observed from the right of FIGURE 7;

FIGURES 10 and 11 are side elevational views, showing two positions of the trip hooks during the resetting operation; and FIGURE 12 is a schematic view generally illustrating the relationship of the overhead conveyor system with respect to the endless belt conveyor.

Referring more particularly to the drawing, the numeral 1 generally designates a suitably driven horizontally extending endless belt conveyor of the troughed-type which is widely used for transferring particulate materials, such as iron ore, from one location to another for any of a number of purposes.

The endless belt conveyor 1 is trained around a roller at both its upstream and downstream ends and may, if desired, be supported along its length by intermediately disposed rollers in the manner well-known in the art; and, if desired, the endless belt conveyor may comprise a series of sections which are arranged in tandem.

The conveyor system for manipulating the sample collectors 2 in accordance with the present invention is shown as comprising a trackway 20 composed of a pair of channel members 21 which are suitably supported above the endless belt conveyor 1. This trackway 20 constitutes a guide and support for a power transmitting conveyor chain 22 which may be of the compound articulating type. That is to say, the individual chain links 23 (see FIGS. 10 and 11) are adapted to pivot in a horizontal plane about their vertical pintles 24 as they pass about the horizontally disposed sprockets of the conveyor system and the chain is further divided into sections composed of a plurality of links which are also adapted to pivot at a vertical plane about horizontal pivots 25 whereby the chain may accommodate itself not only to changes of direction in a horizontal plane, but also in a vertical plane. The chain 22 is movably supported in the trackway 20 by rollers 26 (FIGS. 5, 10 and 11) and it carries at suitably spaced intervals trip hooks which are generally indicated at 27 and which are adapted to receive and carry the bail members 2a of the specimen collectors 2 at certain points along the trackway 20 and to release the bail members at certain other points, as fully described hereinafter. Each of the trip hooks 27 comprise a body member 28 (FIGS. 3 and 5) pivotally secured as at 29 to an arm 30 (FIGS. 5 and 7) depending from certain of the chain links. These body members have side walls 31 and 32 which are joined together at suitable points as by webs 33 (FIGS. 7 and 8).

Adjacent its lower end, the body members 28 of the trip hook 27 is pivotally connected, as at 34, to a carrying member 35 comprising a substantially L-shaped arm having a horizontal portion 38 upon which the bail members 2a of the sample collectors 2 are adapted to rest.

A latch member 39 is pivotally secured as at 40 (FIGS. 7 and 8) to the upper end of the article carrying members 35 and extends upwardly between the side walls 31 and 32 of the body member. It is provided with a laterally extending toe 41 which is adapted to contact a latch or detent rollers 42 journaled as at 43 (FIG. 7) between the side walls 31 and 32 of the body member 28. The latch member 39 extends upwardly beyond the toe 41 and is provided at or adjacent its upper extremity with a trip member 44 (FIG. 8) which is shown in FIGS. 7 and 9 as comprising a roller journaled upon a stud 45 carried by the upper end of the latch member.

Referring to FIG. 7, the toe 41 of the latch member 39 is normally held in engagement with the detent roller 42 by a spring 46. The spring 46 as best shown in FIG. 6 is held between two heads 47 and 48, the former of which is carried by a rod 49 provided with a member 50 having a T-head 51 which engages the outer face of the latch member 39, as will be clear from the drawings. The member 50 passes through a flaring opening 53 formed through the latch member as clearly shown in FIG. 6, thereby permitting the pivoting movements of the rod 49 and member 50 as will be readily understood. The head member 48 is slidably mounted upon the rod 49 and is positioned within a U-shaped yoke 54, the free ends of which are pivotally connected as at 55 to the body member 28 of the trip hook 27.

The spring 46, being under compression between the two head members 47 and 48, will of course tend to force the head 47 toward the left, as viewed in FIG. 6 which force will be transmitted through the rod 49 and member 50 to the latch member 39, thereby normally tending to hold the latch in engagement with the detent roll 42. It will be apparent, however, that if a suitable dog or trip is interposed in the path of the roller 44 as the latter progresses toward the left, as viewed in FIG. 7, its progress will be stopped and the latch member 39 will have its toe 41 disengaged from the detent roller 42, whereupon the weight of the carrying member 35 and the article (i.e. bail member 2a of a sample collector) on the horizontal portion 38 thereof will cause the said member to drop downwardly around its pivot 34 to a position such as that illustrated in FIG. 10. Thus, the bail member 2a of the sample collector 2 will be discharged from the carrying member 35.

One form of the dog for tripping the latch is diagrammatically illustrated in FIG. 5 as comprising an arm 60, pivotally mounted as at 61, and adapted to be moved into and out of the path of the tripping roll 44 by means of a lever 62 rigidly connected to the pivot shaft 61. A link 63 extends from the said lever 62 to one arm of a bell-crank member 64, the other arm of which carries an operating rod 65 which may be either manually or automatically actuated as desired. Obviously by moving the operating rod 65 downwardly the link 63 will be moved toward the right, as viewed in FIG. 5, and the trip member 60 raised out of the path of the tripping roller 44, whereby any particular trip hook may be permitted to pass the tripping mechanism without being tripped.

During the tripping action described immediately hereinbefore, as well as the resetting action to be later described, the carrying hook members are apt to be swung about their pivotal connections 29 with the conveyor chain, and for a number of reasons this tendency is to be avoided. For the purpose of preventing such swinging motion the body member 28 of the hook is provided with a laterally extending arm 66 which carries a roller 67 adapted to enter between suitable guides 68 positioned adjacent the tripping mechanism as shown in FIGURE 5. Since the roller 67 is offset from the pivotal connection 29 of the body member with the chain, it will effectively prevent any swinging movement of the body member during the time it is passing between the guides 68.

As indicated earlier herein the iron ore or other particulate material being conveyed, and which it is desired to sample or analyze, may be supplied to the material receiving area of the endless belt conveyor 1 by means other than an overhead hopper or funnel 3 such as another and preceding endless belt conveyor provided, of course, that the sample collectors and their lifting bails 2a will pass freely therebeneath and that there is sufficient space on the upstream end of the endless belt conveyor to receive the empty sample collectors 2 before the movement of the particulate material thereinto.

Whatever the means for supplying the particulate material to the endless belt conveyor, the endless trackway 20 of the handling means for the sample collector trays or boxes 2 must be so arranged that the trip hooks 27 and their vertically extending carrying members do not interfere therewith.

According to the illustrative embodiments herein the elevated trackway 20 comes into vertical alignment with the endless belt conveyor 1 well upstream with respect to the hopper or funnel 3 and remains so until the point is reached where the empty sample collector 2 is to be deposited on, and be permitted to move along with, the endless belt conveyor. At this point, or shortly in advance thereof, the overhead trackway 20 is provided with a curvilinear portion or bay 20a which extends around the hopper or funnel 3 and back into a vertical plane with the longitudinal center-line of the endless belt conveyor.

As viewed in FIG. 2, this curvilinear portion or bay 20a of the trackway 20 comprises a decline 20b, a lower level 20c, and an incline 20d, the latter connecting with a straight section of the trackway 20 at its original level.

As the roller 26 carrying a trip hook 27 moves along the trackway 20 and onto the decline 20b of the curvilinear portion or bay 20a (FIG. 12), the trip hook is tripped to open-up, the bail 2a thereby released and the sample collector on which it is mounted moves downwardly by gravity onto the endless belt conveyor (FIG. 2) and is free to move therewith under the hopper or funnel and beyond.

The roller 26 carrying the empty trip hook 27 continues to move over the decline 20b, lower level 20a and incline 20d, to return to the initial level of the trackway 20 where the previously opened trip hook 27 remains open until it is automatically re-set, as will be described immediately hereinafter.

As will be readily understood by those skilled in the art, the automatic re-setting means may be disposed wherever it is desired that the trip hook 27 engage and lift a sample collector and it comprises a re-setting cam or guide 70 which is located so as to be engaged by the tripping roller 44 in its lowest position, and said guide, as will be clear from FIGS. 10 and 11 is provided with an inclined surface 71 by which the roller 44 travels from the position shown in FIG. 10 to that shown in FIG. 11 and then to that shown in FIG. 7. This upward travel of the roller 44 has the effect of lifting the latch member 39 from its tripped position shown in FIG. 10 to the point where its toe 41 will again engage over the detent roll 42, it being normally urged into such engagement by the compression spring 46. As soon as the re-setting has been accomplished the roller 44 will move off the re-setting member 70.

As indicated earlier, it is essential to the present invention that the sample collectors 2 be deposited on the endless belt conveyor 1 upstream with respect to the hopper or funnel 3 and permitted to move unrestrainedly under the latter and later on removed with the collected sample intact preparatory to making the required analysis.

The removal of the loaded sample collectors or containers from the endless belt conveyor 1 at the appropriate station downstream with respect to the hopper or funnel may be manual or by means of any of a number of conventional lifting and/or translating instrumentalities.

On the other hand, the teachings of the present invention contemplate the removal of the loaded sample collectors or containers 2 from the endless belt conveyor 1 shortly after they have emerged from beneath the hopper or funnel 3; and the direct transfer thereof to the analysis or sampling station while supported by the trip hooks 27 on the trackway 20.

After the removal of the contents of the sample collectors 2 at the sampling station, the empty sample collectors are placed in a pick-up position at a pick-up station where the trip hooks 27 engage their upwardly extending bail members 2a and are re-set, immediately following which the empty sample collectors or containers 2 are returned to the up-stream end of the endless belt conveyor 3 for re-use in the manner previously described.

It will be readily understood by those skilled in the art that whether the trip hooks 27 are (a) picking-up a loaded sample container from the downstream portion of the endless belt conveyor 3;
(b) depositing a loaded sample container 2 at the (sample) container removal station;
(c) picking-up an empty sample container downstream with respect to the sampling station; or
(d) depositing an empty sample container on the upstream portion of the endless belt conveyor 3;

the means for opening and closing, or re-setting, the trip hooks 27 may be readily adjusted to accommodate the same.

A station along the trackway 20 for picking-up and removing loaded sample collectors from the endless belt conveyor may comprise a curvilinear portion or bay 120a, with a decline 120b, lower level 120c and incline 120d; together with suitable means, such as trip member 60, tripping roller 44 etc. for tripping or opening the trip hook 27 immediately before it moves onto the decline 120b and toward the endless belt conveyor. This relationship of the elements is represented in the left-hand portion of the composite elevational view of FIGURE 4.

After the opened trip hook 27 has engaged the vertically extending bail member 2a and is re-set, the loaded sample container moves upward as the trip hook moves along the incline 120d to regain the horizontal level of the trackway 20.

The deposit station for the loaded sample containers picked-up and removed from the endless belt conveyor 1 in the manner described shortly hereinbefore is represented in the right-hand portion of the composite elevational view of FIGURE 4. In this showing, i.e. the right-hand portion of FIGURE 4, the floor of the loaded sample container deposit station comprises a roller table which is removed from the endless belt conveyor 3.

According to the construction and arrangement described herein a variety of choices are provided for the handling of the sample collectors or containers with respect to the actual filling or loading thereof.

Any suitable means may be employed for driving the endless belt conveyor 1, such as a conventional electric motor connected to its upstream supporting roll.

The driving means for the power transmitting conveyor chain 22 which carries the trip hooks 27 may also take one of several different forms, including a suitably connected variable speed electric motor.

In some instances it may be desirable to have the driving means for the conveyor chain 22 and the trip hooks 27 moving in a definitely timed relationship with respect to the endless belt conveyor.

If desirable means may readily be provided for increasing the speed of the conveyor chain 22 and trip hooks 27 with respect to the speed of the endless belt conveyor 1 at certain intervals including that where the trip hooks has to catch-up with the endless belt conveyor 1 in order to remove the loaded sample collector.

Correspondingly, the speed of the conveyor chain 22 and trip hook 27 may be materially increased or decreased with respect to the linear speed of the endless belt conveyor, such as at the earlier described loaded sample container pick-up station and the loaded sample container deposit station.

It is also to be understood that the particular apparatus shown herein for handling the sample collector 2 as such forms no part of the present invention and that various other means for accomplishing the same purposes may be substituted therefor.

The sample collectors or containers may be composed of any suitable material including various metals, plastics, wood, rubber, etc., and possibly of the same material as the endless belt conveyor 1.

For illustrative purposes the sample collector 2 has been shown as having a single bail member 2a which is disposed at, and projects upwardly from the sample collector at approximately its transverse center-line; but various other pick-up members may be utilized in lieu thereof, including a bail member at each of the ends of the sample collector in which case the trip hooks 27 would be modified accordingly and there would be less tendency toward swinging.

I claim:

1. The process of sampling particulate materials which includes moving the material onto a subjacent endless belt conveyor in the form of a stream and at a point which is proximate to, but spaced from, the upstream extremity of the endless belt conveyor; disposing on an unloaded upstream portion of the endless belt conveyor a sample collector which extends transversely of the endless belt conveyor and is of sufficient width to collect a true sample of the aforementioned stream of particulate material as it would be had if fallen directly onto the endless belt conveyor; and removing the sample collector from the endless belt conveyor after it has been loaded with the particulate material.

2. The process of claim 1 wherein the stream of particulate material moving onto the endless belt conveyor is of substantially the same width as the latter.

3. Apparatus for conveying particulate material and sampling the same while it is in motion comprising, in combination,
   an endless belt conveyor;
   means disposed proximate to, but spaced from, the upstream extremity of said endless belt conveyor for moving the particulate material thereonto;
   an elongate sample collector which is adapted for disposition on that portion of said endless belt which is upstream of said first-named means and for movement with said endless belt conveyor under and beyond said first-named means;
   the length of said elongate sample collector being approximately equal to the width of said endless belt conveyor and the width thereof being adequate to receive a truly representative sample of the particulate material moving from said first-named means;
   means for placing said sample collector on that portion of said endless belt conveyor which is upstream with respect to said first-named means and at a substantially normal angle with respect to the axis of said endless belt conveyor; and
   means for removing the loaded sample collector from said endless belt conveyor.

4. The apparatus of claim 3 wherein the means for moving the particulate material onto the endless belt conveyor includes an overhead discharge orifice which extends substantially across, and is substantially as wide as, the endless belt conveyor.

5. Apparatus for sampling particulate material moving on an endless belt conveyor comprising, in combination,
   an elevated trackway extending along and above a substantial portion of the endless belt conveyor;
   means for moving particulate material onto said endless belt conveyor at a point which is proximate to but spaced from the upstream extremity thereof;
   an elevated trackway extending along and above a substantial portion of said endless belt conveyor;
   an endless chain carried by said trackway and adapted for movement thereon;
   a plurality of substantially spaced hanger members carried by said endless chain;
   a trip-hook secured to the lower end of each of said hanger members;
   a plurality of elongate sample collectors of a length which is approximately equal to the width of said endless belt conveyor;
   a bail member secured to and extending upwardly from each of said sample collectors for engagement by said trip-hooks;
   means associated with said trip-hooks for enabling the same to successively deposit empty sample collectors on said endless belt conveyor at a point which is upstream with respect to said first-named means;
   means associated with said trip-hooks for removing said sample collectors from said endless belt conveyor after they have been loaded with particulate material; and
   means associated with said trip-hooks for returning the empty sample collectors to the initial position on said endless belt conveyor as described hereinbefore.

References Cited

UNITED STATES PATENTS

| 2,033,549 | 3/1936 | Reuter | 73—423 |
| 2,889,709 | 6/1959 | Blyth | 73—423 |

S. CLEMENT SWISHER, Primary Examiner